United States Patent Office 3,085,041
Patented Apr. 9, 1963

3,085,041
ALIPHATIC SULFONYL FLUORIDE FUNGICIDE
James B. Buchanan, Wilmington, Del., assignor to E. I. du Pont de Nemours and Company, Wilmington, Del., a corporation of Delaware
No Drawing. Filed Jan. 23, 1959, Ser. No. 788,500
4 Claims. (Cl. 167—22)

This invention relates to novel fungicidal compositions and methods employing certain chlorinated aliphatic sulfonyl fluorides.

It is frequently necessary for successful crop production to treat the soil or plant growth medium with a chemical to kill out or inhibit the development of plant pathogenic fungi prior to or after seeding or setting susceptible plants.

It has now been discovered that plant pathogenic fungi in the soil or growth medium can be controlled and prevented with compounds of the formula:

(1)                 R—SO$_2$F where R is a chlorinated aliphatic hydrocarbon radical containing less than 13 carbon atoms per radical.

By the term "aliphatic hydrocarbon" is included both branched chain and straight chain alkyl radicals and alkenyl radicals. By the term "chlorinated" is meant that the aliphatic hydrocarbon radical contains one or more chlorine atoms substituted on the chain. Each carbon atom in the chain can contain one or two chlorine atoms and methyl groups attached to the chain (including terminal methyl groups) can contain one, two or three chlorine atoms. The exact position of chlorine atoms in a molecule depends upon the method of manufacture and in a given case is often not known or necessary to know from the standpoint of fungicidal activity, although certain configurations are naturally more active than others.

By treating soil with the fungicides of Formula 1 (above), fungus infections of roots and other underground parts of plants are very effectively prevented or controlled.

PREPARATION

The compounds of Formula 1 can be prepared by any conventional methods. For example, one method for preparing these compounds is summarized by the following equations:

(2)    CH$_3$CH$_2$SO$_2$Cl + KHF$_2$ $\xrightarrow{H_2O}$ CH$_3$CH$_2$SO$_2$F (3)    CH$_3$CH$_2$SO$_2$F + 3Cl$_2$ $\xrightarrow[50-70°]{U.V.}$ Cl$_3$CCH$_2$SO$_2$F The process covered by Equation 2 is general for the preparation of sulfonyl fluoride intermediates for the compounds of Formula 1. By reacting ethane sulfonyl chloride with a slight molar excess of potassium bifluoride in water, separating the lower organic layer, and washing the product with a small amount of water, one obtains the desired intermediate, ethane sulfonyl fluoride. Other reagents, under suitable conditions, disclosed fully in the literature, can be employed for this halogen interchange.

Ethane sulfonyl fluoride is directly chlorinated in the absence of a solvent to the trichlorinated analog, 2,2,2-trichloroethanesulfonyl fluoride as in Equation 3 above. Analytically pure samples can be obtained by fractional distillation, but for the uses disclosed in this invention, crude reaction mixtures are entirely satisfactory.

Another way of obtaining the compounds of Formula 1 is to convert a chlorinated sulfonyl chloride to the sulfonyl fluoride, that is, the above-described preparatory scheme is employed, except that direct chlorination occurs one step earlier, followed by halogen interchange, as illustrated by the following equations:

(4)    CH$_3$CH$_2$SO$_2$Cl + 2Cl$_2$ $\xrightarrow[50-70°]{U.V.}$ CHCl$_2$CH$_2$SO$_2$Cl (5)    CHCl$_2$CH$_2$SO$_2$Cl + KHF$_2$ $\xrightarrow{H_2O}$ CHCl$_2$CH$_2$SO$_2$F Note that the foregoing reactions involving the ethane series were chosen for illustrative purposes only, for these reactions are applicable to any and all compounds of the invention.

In many cases a mixture of isomers is obtained by chlorination as indicated by the following equation:

(6)
CH$_3$(CH$_2$)$_{11}$SO$_2$F + 10Cl$_2$ $\xrightarrow[50-70°]{U.V.}$ mixture of isomers of decachlorododecanesulfonyl fluoride Still another way of preparing the compounds of Formula 1 is by the addition of SO$_2$FCl to olefins, as exemplified by the following equation:

(7)    CH$_2$=CH$_2$+SO$_2$FCl→ClCH$_2$—CH$_2$SO$_2$F

For further details on this method, see U.S. Patent No. 2,846,472.

FORMULATION

Fungicidal compositions of the present invention containing at least one of the compounds of Formula 1 above can be prepared by admixing at least one of these compounds with pest control adjuvants or modifiers to provide compositions in the form of solutions, dusts, water-dispersible powders, and aqueous dispersions or emulsions. Thus, the compounds of Formula 1 can be used with a carrier or diluent agent such as a finely divided solid, a solvent liquid of organic origin, water, a wetting agent, a dispersing agent, an emulsifying agent, an aqueous emulsion or any suitable combination of these.

Compositions of the invention, especially liquids and wettable powders, contain as a conditioning agent one or more surface-active agents in amounts sufficient to render a given composition containing the compounds of Formula 1 readily dispersible in water or in oil. By the term "surface-active agent," it is understood that wetting agents, dispersing agents, suspending agents and emulsifying agents are included.

Suitable surface-active agents are set out, for example, in Searle U.S. Patent 2,426,417, Todd U.S. Patent 2,655,447, Jones U.S. Patent 2,412,510, or Lenher U.S. Patent 2,139,276. A detailed list of such agents is set forth by J. W. McCutcheon in "Soap and Chemical Specialties," December 1957, January, February, March and April 1958. See also McCutcheon in "Chemical Industries," November 1947, page 8011 et seq., entitled "Synthetic Detergents," and Bulletin E-607 of the Bureau of Entomology and Plant Quarantinee of the U.S. Dept. of Agriculture. In general, less than 10 percent weight of the surface-active agent is present in the compositions of the invention, although usually the amount of surface-active agent in these compositions is less than 1 percent by weight.

Several different types of compositions containing the compounds of Formula 1 have been developed so that the compounds of Formula 1 can be used to greatest advantage to control soil fungi. These preferred formulations comprise certain wettable powders, certain dusts, certain emulsifiable oils, certain solutions in solvents, and certain granules. In general, these preferred compositions will all usually contain a wetting agent, a dispersant, or an emulsifying agent. A surfactant is not essential for operability in dusts, solvent solutions or granules, but is generally found to be advantageous in promoting distribution of the active material in the soil following application.

WETTABLE POWDERS

Wettable powders are water-dispersible compositions containing the active material, an inert solid extender, and one or more surfactants to provide rapid wetting and prevent heavy flocculation when suspended in water.

The inert extenders which should be used in the preferred wettable powders of this invention containing the compounds of Formula 1 are preferably of mineral origin and the surfactants are preferably anionic or non-ionic.

Suitable surfactants for use in such compositions are listed by J. W. McCutcheon in "Soap and Chemical Specialties," December 1957, January, February, March and April 1958. The classes of extenders most suitable for the wettable powder formulations of this invention are the natural clays, diatomaceous earth, and synthetic mineral fillers derived from silica and silicate. Among non-ionic and anionic surfactants, those most suitable for the preparation of the dry, wettable products of this invention are solid forms of compounds known to the art as wetters and dispersants. Occasionally a liquid, non-ionic compound classified primarily as an emulsifier may serve as both wetter and dispersant, but such types are usually avoided because of the difficulty in obtaining homogeneous distribution through the solid mass.

The active compounds shown in Formula 1 above are mostly all liquids or low melting solids. The most preferred diluents for making wettable powders in this case are the righly absorptive diluents such as attapulgite clay, diatomaceous silica, synthetic fine silica and synthetic calcium or magnesium silicate. With these diluents the active level can be made as high as 25 percent or even 50 percent (by weight) and still yield a free-flowing powder. Preferred wetting agents in this case do include liquid non-ionic agents since the active is frequently also a liquid which requires intensive mixing in order to obtain homogeneity. The most preferred wetting agents are alkyl benzene and alkyl naphthalene sulfonates, sulfated fatty-alcohols, -amines, or -acid amides, long chain acid esters of sodium isethionate, esters of sodium sulfosuccinate, alkyl-aryl polyether alcohols, polyoxyethylene modified esters of fatty and resin acids, sulfated or sulfonated fatty acid esters, petroleum sulfonates, sulfonated vegetable oils and ditertiary acetylenic glycols. Preferred dispersants are methyl cellulose, polyvinyl alcohol, sodium lignin sulfonates, polymeric alkyl naphthalene sulfonates, sodium naphthalene sulfonate, polymethylene bis naphthalene sulfonate and sodium N-methyl-N-(long chain acid)taurates.

Wetting and dispersing agents in these preferred wettable powder compositions of this invention are usually present at concentrations of from about 0.75 weight percent to 5 weight percent. Usually, the wetting agent concentration is 0.5 weight percent to 2.0 weight percent with the dispersant making up the balance. With either a 25 percent or a 50 percent (by weight) active composition, the inert extender then completes the formulation. Where needed, 0.1 weight percent to 1.0 weight percent of the extender may be replaced by a corrosion inhibitor or an anti-foaming agent or both.

Thus, wettable powder formulations of the invention will contain from about 25 to 50 weight percent active material, from 0.5 to 2.0 weight percent wetting agent, from 0.25 to 5.0 weight percent dispersant, and from 43 to 74.25 weight percent inert extender, as these terms are described above.

When the wettable powder contains a corrosion inhibitor or an anti-foaming agent or both, the corrosion inhibitor will not exceed about 1 percent of the composition, and the anti-foaming agent will not exceed about 0.5 percent by weight of the composition, both replacing equivalent amounts of the inert extender.

DUSTS

Dusts are dense powder compositions which are intended for application in dry form, in accordance with the preferred compositions and methods of the invention. Dusts are characterized by their free-flowing and rapid settling properties so that they are not readily windborne to areas where their presence is not desired. They contain primarily an active material and a dense, free-flowing solid extender.

Their performance is sometimes aided by the inclusion of a wetting agent, and convenience in manufacture frequently demands the inclusion of an inert, absorptive grinding aid. For the compounds of this invention, the inert extender may be either of vegetable or mineral origin, the wetting agent is preferably anionic or non-ionic, and suitable absorptive grinding aids are of mineral origin.

Suitable classes of inert solid extenders for use here are those organic or inorganic powders which possess high bulk density and are very free-flowing. They are also characterized by possessing relatively low surface areas and are poor in liquid absorption. Suitable classes of grinding aids are some natural clays, diatomaceous earths, and synthetic mineral fillers derived from silica or silicate. Among ionic and non-ionic wetting agents, the most suitable are the members of the group known to the art as wetting agents and emulsifiers. Although solid agents are preferred because of ease in incorporation, some liquid non-ionic agents are suitable in this invention since most of the active agents are also liquids.

Preferred inert solid extenders for the dusts of this invention are micaceous talcs, pyrophyllite, dense kaolin clays, ground calcium phosphate rock such as that known as "Phosphodust" (a trademark of the American Agricultural Chemical Co.) and tobacco dust.

Preferred grinding aids are attapulgite clay, diatomaceous silica, synthetic fine silica and synthetic calcium and magnesium silicates. Preferred wetting agents are those previously listed under wettable powder formulations.

The inert solid extenders in the dusts of this invention are usually present in concentrations of from about 30 to 90 weight percent of the total composition. The grinding aid will usually constitute 5 to 50 weight percent of the composition, and the wetting agent will constitute from about 0 to 1.0 weight percent of the composition. Dust compositions can also contain other surfactants such as dispersing agents in concentrations of up to about 0.5 weight percent.

Since the active components of this invention are liquids or low melting solids, it is most convenient to first extend them upon absorptive fillers by blending and grinding, then subsequently blending this mixture with the dense major diluent. In this manner, the cost of grinding the larger volume of major diluent is avoided and, in addition, an undesirable reduction in the particle size of the dense diluent can be prevented.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Thus, the dust compositions of this invention will comprise about 5 to 20 weight percent active material, 5 to 50 weight percent absorptive filler, 0 to 1.0 weight percent wetting agent, and about 30 to 90 weight percent dense, free-flowing dust diluent, as these terms are used herein. Such dust formulations can contain, in addition, minor amounts of dispersants, corrosion inhibitors, and anti-foam agents, derived from the wettable powders used to make the dusts.

EMULSIFIABLE OILS

Emulsifiable oils are usually solutions of active material in non-water miscible solvents together with a surfactant. When the active component is itself a liquid immiscible with water, the emulsifiable oil may comprise active material and surfactant without solvent.

For the compounds of this invention, emulsifiable oils can be made either by mixing the active ingredient with a solvent and surfactant or by mixing the active ingredient with surfactant alone. Suitable solvents for the compounds of this invention are hydrocarbons (substituted or unsubstituted), and non-water miscible ethers, esters, or ketones. Suitable surfactants are those anionic or non-ionic agents known to the art as emulsifying agents. Such compounds can be found listed by J. B. McCutcheon in "Soap and Chemical Specialties" for December 1957, and January, February, March, and April of 1958. The solvents most suitable for the emulsifiable oils of this invention are those which are relatively non-phytotoxic or are sufficiently volatile to vaporize from the soil before damage to crop plants occurs. Suitable solvents are volatile isoparaffins, with a maximum boiling point of about 500° F., lower molecular weight aromatic hydrocarbons, such as benzene, toluene, xylene, and alkylated naphthalenes, volatile low molecular weight esters, ethers and water immiscible ketones, such as ethyl to amyl acetate, diethyl to dibutyl ether and methylisobutyl ketone to dibutyl ketone. In cases where the application of the soil fungicides of this invention precedes the growth of plants, other oils can be used, such as diesel oil, less highly purified hydrocarbons with higher boiling points, chlorinated hydrocarbons, and the like.

Emulsifying agents most suitable for the compositions of this invention are alkyl aryl polyethoxy alcohols, alkyl and alkyl aryl polyether alcohols, polyoxyethylene sorbitol or sorbitan fatty acid esters, polyethylene glycol fatty esters, fatty alkylol amide condensates, amine salts of fatty alcohol sulfates plus long chain alcohols and oil soluble petroleum sulfonates. Such emulsifying agents will comprise from about 3 to 10 weight percent of the total composition.

Thus, emulsifiable oil compositions of the present invention will consist of from about 25 to 95 weight percent active material, about 0 to 72 weight percent solvent, and about 3 to 10 weight percent emulsifier, as these terms are defined and used above.

GRANULES

Granules are physically stable, particulate compositions containing active material (here, the compounds of Formula 1) adhering to or distributed through a basic matrix of a coherent, inert carrier with macroscopic dimensions. In order to aid leaching of active ingredient from the granule, a surfactant is usually present, but may be unnecessary if release of active is by other means such as volatility.

For the compounds of this invention, the inert carrier is preferably of mineral origin, and the surfactant is a compound known to the art as a wetting agent. Such compounds are listed by J. B. McCutcheon in "Soap and Chemical Specialties," December 1957, January, February, March and April 1958.

Suitable carriers are natural clays, some pyrophyllites and vermiculite. Suitable wetting agents are anionic or non-ionic.

For the granule compositions of this invention, most suitable carriers are of two types. The first are porous, absorptive, preformed granules, such as preformed and screened granular attapulgite or heat expanded, granular, screened vermiculite. On either of these, the liquid active agent can be sprayed and will be absorbed at concentrations up to 25 weight percent of the total weight. The second suitable types are initially powdered kaolin clays, hydrated attapulgite, or bentonitic clays, either sodium, calcium, or magnesium bentonites. These are blended with the active components to give mixtures that are granulated and dried to yield granular material with the active component distributed uniformly throughout the mass. Such granules can also be made with 25 to 30 weight percent active component, but more frequently a concentration of about 10 weight percent is desired for optimum distribution on a soil surface.

The most suitable wetting agents for the granular compositions of this invention depend upon the type of granule used. When preformed granules are sprayed with active material in liquid form, the most suitable wetting agents are non-ionic, liquid wetters miscible with the active component. These are compounds more generally known to the art as emulsifiers, and comprise alkyl aryl polyether alcohols, alkyl polyether alcohols, polyoxyethylene sorbitol or sorbitan fatty acid esters, polyethylene glycol fatty esters, fatty alkylol amide condensates and oil soluble petroleum or vegetable oil sulfonates. Such agents will usually comprise from about 0 to 5 weight percent of the total composition.

When the active is first mixed with a powdered carrier and subsequently granulated, liquid non-ionic wetters can still be used, but it is usually preferable to incorporate at the mixing stage one of the solid, powdered anionic wetting agents such as those previously listed for the wettable powders. Such agents will comprise from about 0 to 2 weight percent of the total composition.

The granular compositions of this invention are most useful in two different mesh ranges. For some purposes, a mesh size range of from about 30 to 60 mesh is most desirable, as when treating seed furrows, while for other purposes a 15 to 30 mesh range is more desirable.

Thus, the preferred granular formulations of this invention comprise about 15 to 60 mesh granules containing from about 5 to 30 weight percent active material, about 0 to 5 weight percent wetting agent, and about 65 to 95 weight percent inert mineral carrier, as these terms are used herein.

METHODS OF USE

In accordance with the invention, compounds of Formula 1 are applied to the soil or growth medium in sufficient concentration to kill or otherwise inhibit the development of fungi pathogenic to plants or damaging to plant products. In general, applications in the range of from about 1 to 300 pounds of the active compound per acre of surface treated gives satisfactory control of such soil-borne fungi as species of Pythium, Rhizoctonia, Phytophthora, Fusarium, Sclerotinia, Verticillium, Aphanomyces, Ascochyta and the like. The optimum dosage will thus vary over a wide range which is determined and controlled by such factors as effectiveness of the specific active compound employed, soil type, method of application, climatic conditions, tolerance of crop to the compound, stage of crop plant development at the time of treatment, and the like. Optimum rates of treatment for each specific case can be and in actual practice conventionally are determined by those skilled in the art to meet the particular needs at hand.

A preferred method of applying active compounds of this invention to the soil is carried out by uniformly distributing the selected compound over the surface of the area to be treated and then mixing the fungicidal component immediately with the top 1 to 12 inches or more of soil.

The selected formulation is sprayed on the soil surface in the form of wettable powder, emulsifiable or solution formulation or may be distributed in the form of a dust or granular formulation using conventional equipment. Mixing the chemical with the soil can easily be accomplished by means of a rototiller, disc or by a hand tool such as a rake.

Another preferred method of treating soil with the compounds of the invention is to apply them to the seed-furrow surfaces during the seeding operation. Solutions, wettable powders, or emulsifiable formulations or dusts may be distributed into the open furrow just ahead of the seed distributor or of the closing or packing discs and wheel of conventional seeding equipment. Using this method, compounds of the invention, i.e. those of Formula 1, should be applied at dosage rates in the range of from about 0.05 to 5 pounds of active ingredient per 10,000 feet of row. Of course those skilled in the art will appreciate that the particular usage for any particular seeding operation can be determined by using methods routinely used in the art.

Injecting soluble, emulsifiable or wettable powder formulations into the soil by shank or other convention injection equipment constitutes another preferred method of treating soil with compounds of Formula 1 above.

Employing a "shank" or "chisel" applicator, injections should be made at 6 to 12 inch spacings and at depths of from about 2 to 10 inches or more below the soil surface. Equipment distributing a continuous layer at a depth in the range of from about 2 to 10 inches can also be used advantageously.

Treated areas may involve narrow bands in the seeding zone or broadcast over the entire field. Preferred application rates with the invention, i.e. compounds of Formula 1 above applied by this method, range from about 1 to 300 pounds per acre of the surface area treated, although as can be appreciated the rates may be above or below this amount depending upon extreme situations.

Another method of applying the invention and using the compounds of Formula 1 to control soil-borne fungi is to drench the locus to be treated with water containing one or more of the Formula 1 compounds in suspension using wettable powders or emulsions. Sufficient water should be applied to carry the active chemical down to a depth of from 2 inches or more below the soil surface, application rates varying from about 1 to 300 pounds of active ingredient per acre of treated soil surface are desirable for disease control.

Compounds of the invention may also be used for the protection or therapy of established plants. By this method, granular formulations are applied as a soil dressing on either or both sides of a plant row and then are covered with a cultivator tool or hand implement such as a hoe. Similarly, the compounds of Formula 1 can be applied for the protection or therapy of established plants by spraying or dusting in a manner indicated above.

In order that the invention can be better understood, the following examples are given. The examples illustrate the compounds of Formula 1 and fungicidal compositions and methods of use employing these compounds. Unless otherwise indicated, the chlorinated materials shown are made by chlorinating the appropriate starting materials as described above until the indicated degree of halogenation has occurred.

*Example 1.—2,2,2-Trichloroethanesulfonyl Fluoride*

A stream of chlorine at the rate of 2 parts by weight per minute is conducted into 67.5 parts by weight of ethanesulfonyl fluoride with stirring at 50–60° under ultraviolet radiation. When the reaction mixture has gained 62 parts in weight, the chlorination is stopped to give essentially pure 2,2,2-trichloroethanesulfonyl fluoride. A portion is purified (distillation) for identification purposes.

*Analysis.*—Calcd. for $C_2H_2Cl_3FO_2S$: Cl, 49.37. Found: Cl, 49.13, 49.67.

Similarly, other chlorinated sulfonyl fluorides are obtained by the above procedure. Some examples are listed in Table I, where the indicated alkanesulfonyl fluoride is allowed to gain a specific weight on chlorination, corresponding to the indicated number of chlorine atoms per molecule.

TABLE I

| Example No. | Reactant, alkanesulfonyl fluoride, alkane= | Wt. gain due to Cl subst., parts by weight | Equiv. of Cl | Chief product, R—$SO_2F$, R= |
|---|---|---|---|---|
| 2 | methane-, 78.4 parts wt | 27 | 1 | chloromethane-. |
| 3 | butane-, 140 parts | 173 | 5 | pentachlorobutane-. |
| 4 | propane-, 63 parts | 34.5 | 2 | 3,3-dichloropropane-. |
| 5 | 1-methylethane-, 63 parts | 67 | 4 | tetrachloro-1-methylethane. |
| 6 | 1-methylpropane-, 70 parts | 120 | 7 | tetrachloro-1-(trichloro-methyl)-propane-. |
| 7 | 1,1 - dimethylethane-, 140 parts | 71 | 2 | 2-chloro-1-(chloromethyl)-1-methylethane-. |
| 8 | 1,1 - dimethylpropane -, 76 parts | 120 | 7 | heptachloro-1,1-dimethylpropane. |
| 9 | dodecane-, 135 parts | 17 | 1 | chlorododecane-. |

*Example 10.—2-Chloroethanesulfonyl Fluoride*

2-chloroethanesulfonyl chloride (54 parts by weight) is added dropwise over a 30-minute period to a stirred solution of 39 parts by weight of potassium bifluoride in 35 parts by weight of water at room temperature. The mixture is warmed to 50° and stirred at this temperature for ½ hour, followed by cooling and adding sufficient water to dissolve the inorganic salts. The lower organic layer is removed and washed with water to give essentially pure 2-chloroethanesulfonyl fluoride.

Further examples of the synthesis of chlorinated alkanesulfonyl fluorides by the above method are listed in Table II.

TABLE II

| Example No. | Reactant I R-$SO_2Cl$, R= | Reactant II $KHF_2$ parts by weight | Product |
|---|---|---|---|
| 11 | 2, 2-dichloroethane-, 17.8 parts by weight. | 10.5 | Corresponding sulfonyl fluoride. |
| 12 | pentachloroethane-, 157 parts | 39 | Do. |
| 13 | tetrachloro-3-methylpentane-, 32 parts. | 11 | Do. |
| 14 | hepta-chloroheptane-, 351 parts. | 100 | Do. |
| 15 | tetrachloro-5, 5-dimethyl-hexane-, 280 parts. | 117 | Do. |
| 16 | 3-chloropropane-, 177 parts | 117 | Do. |
| 17 | trichloro-octane-, 317 parts | 117 | Do. |
| 18 | 2-chloro-1- (dichloromethyl) ethane, 252 parts. | 120 | Do. |

Example 19.—Emulsifiable Formulation

The following emulsifiable formulation is made by simple mixing of the two liquid components:

| | Percent |
|---|---|
| 2,2,2-trichloroethanesulfonyl fluoride | 90 |
| Mixed polyoxyethylene ethers and oil soluble petroleum sulfonates | 10 |

It is emulsifiable in water and can be applied with conventional spray apparatus.

The above example is illustrative for preparing emulsifiable formulations for the liquid compounds of Formula 1.

Example 20.—Emulsifiable Formulation

The following formulation is prepared according to Example 19:

| | Percent |
|---|---|
| Chloromethanesulfonyl fluoride | 92 |
| Alkyl aryl polyether alcohol | 8 |

Example 21.—Emulsifiable Formulation

The following formulation is prepared according to Example 19:

| | Percent |
|---|---|
| 2,3-dichloropropanesulfonyl fluoride | 90 |
| Polyethylene glycol fatty ester | 10 |

Example 22.—Soil Fungicidal Granules

Soil fungicidal granules illustrating preparation and application of compositions of this invention are prepared as follows:

| | Percent |
|---|---|
| Tetrachloroethanesulfonyl fluoride | 25 |
| 30–60 mesh granular vermiculite | 75 |

The above granular product is prepared by spraying the active material in the form of a warmed liquid on the surface of the vermiculite while tumbling the latter to obtain uniform distribution. The product can be spread on the soil surface and disked in to act as a soil fungicide.

Example 23.—Soil Fungicide Granules

The following formulation is prepared according to Example 22:

| | Percent |
|---|---|
| Pentachlorobutanesulfonyl fluoride | 25 |
| 15–30 mesh granular Attaclay | 75 |

Example 24.—Soil Fungicide Granules

The following formulation is prepared by dry blending of the components, moistening with water, granulating and drying:

| | Percent |
|---|---|
| Chlorododecanesulfonyl fluoride | 25 |
| 30–60 mesh granular Ca, Mg bentonite | 74 |
| Alkylnaphthalene sulfonate, Na salt | 1 |

Example 25.—Emulsifiable Solution

An emulsifiable solution containing a compound of this invention for soil fungicidal application is illustrated by the following formulation examples:

| | Percent |
|---|---|
| (a) 2,2,2-trichloroethane sulfonyl fluoride | 50 |
| Alkylated naphthalene, principally α-methyl naphthalene | 45 |
| Alkyl aryl polyether alcohol | 5 |
| (b) Dichloromethanesulfonyl fluoride | 50 |
| Methyl isobutyl ketone | 45 |
| Polyoxyethylene modified glycol mono oleate | 5 |

The above liquid components are mutually miscible. The resulting respective liquids can be emulsified in water and sprayed.

Example 26.—Emulsifiable Solution

The following formulation is prepared according to Example 25:

| | Percent |
|---|---|
| 2-chloroethanesulfonyl fluoride | 50 |
| Methylisobutyl ketone | 45 |
| Petroleum sulfonate | 5 |

Example 27.—Emulsifiable Solution

The following formulation is prepared according to Example 25:

| | Percent |
|---|---|
| 3-chloropropanesulfonyl fluoride | 50 |
| Methyl isobutyl ketone | 45 |
| Polyoxyethylene modified sorbitol fatty acid ester | 5 |

Example 28.—Emulsifiable Formulation

The following components are mutually soluble to form an emulsifiable liquid which can be diluted with water and applied:

| | Percent |
|---|---|
| Tetrachloro-5,5-dimethylhexanesulfonyl fluoride | 25 |
| Ethyl acetate | 70 |
| Polyoxyethylene modified esters of mixed fatty and resin acids | 5 |

Example 29.—Emulsifiable Formulation

The following formulation is prepared according to Example 28:

| | Percent |
|---|---|
| Tetrachloro-3-methylpentanesulfonyl fluoride | 25 |
| Ethyl acetate | 70 |
| Alkyl polyether alcohol | 5 |

Example 30.—Emulsifiable Formulation

The following formulation is prepared according to Example 28:

| | Percent |
|---|---|
| Tetrachloro-5,5-dimethylhexanesulfonyl fluoride | 25 |
| Ethyl acetate | 70 |
| Amine salt of fatty alcohol sulfate and long chain alcohol | 5 |

Example 31.—Wettable Powder Formulation

A wettable powder is prepared by spraying the warmed molten active ingredient into a blending mixture of the diluent and surface active agents, followed by micropulverizing to eliminate agglomerates. The resulting wettable powder may be dispersed in water for application to soil.

| | Percent |
|---|---|
| Octachloroheptanesulfonyl fluoride | 25 |
| Alkyl naphthalene sulfonate | 1 |
| Sodium lignin sulfonate | 1 |
| Attapulgite clay | 73 |

Example 32.—Wettable Powder Formulation

The following formulation is prepared according to Example 31:

| | Percent |
|---|---|
| Trichloro-1-methylethanesulfonyl fluoride | 25 |
| Oleyl ester of sodium isethionate | 2 |
| Attapulgite clay | 73 |

Example 33.—Wettable Powder Formulation

The following formulation is prepared by first dissolving the wetting agent in the warmed liquid active material then spraying upon a blending base of diluent followed by micropulverizing:

| | Percent |
|---|---|
| 2-chloro-1-(chloromethyl)-1-methylethanesulfonyl fluoride | 25 |
| Alkyl, aryl polyether alcohol | 3 |
| Synthetic calcium silicate | 72 |

*Example 34.—Application*

The more volatile members of the compounds of this invention can be directly injected into the soil for control of pathogenic fungi of the soil. The following compounds are examples of volatile members which can be directly injected into the soil and thus involve no formulation:

Chloromethanesulfonyl fluoride
Dichloromethanesulfonyl fluoride
Trichloromethanesulfonyl fluoride
2-chloroethanesulfonyl fluoride
1-chloroethanesulfonyl fluoride
1,2-dichloroethanesulfonyl fluoride
2,2,2-trichloroethanesulfonyl fluoride
3-chloropropanesulfonyl fluoride
1-(chloromethyl)propanesulfonyl fluoride
2-chlorobutanesulfonyl fluoride
2-(chloromethyl)butanesulfonyl fluoride
2,2-dichloroethanesulfonyl fluoride
1,2,2-trichloroethanesulfonyl fluoride

*Example 35*

2,2,2-trichloroethanesulfonyl fluoride is applied to soil infested with *Rhizoctonia solani* (or Pythium species) at a rate of 10 pounds per acre. The material is mixed thoroughly with the soil and cotton (or bean or cucumber) seeds are planted. After emergence of the plants they are examined for disease. Those plants grown in treated soil are entirely free of disease, whereas those grown in untreated soil are dead or dying of damping off and root rot.

*Example 36*

The emulsifiable formulation of Example 19 is applied to soil known to be infested with the pathogenic fungus *Rhizoctonia solani*. The material is thoroughly mixed into the soil at a rate of 25 pounds per acre. A cotton crop is then planted. After the cotton is emerged, the seedlings are examined for disease. The plants grown in treated soil are satisfactorily protected from disease by the anti-fungal agents.

Similar results are obtained by employing the formulations of Example 20 and of Example 21 in the above test.

*Example 37*

The formulation of Example 22 is mixed with soil at a rate of 100 pounds per acre. The soil is known to be infested with *Fusarium solani*, a fungus capable of causing severe damping off and root rot to tomato. The tomato seedlings, examined after emergence, are satisfactorily protected from the pathogen.

Similar results are obtained by employing the soil fungicide granules of Example 23 and of Example 24 in the above test.

*Example 38*

The emulsifiable composition of Example 25 is applied to soil at a rate of 50 compounds per acre and thoroughly mixed to a depth of 6 inches. The soil is known to be infested with organisms capable of causing damping off or root rots—Pythium species. Cucumbers are planted and after they have germinated, the seedlings are examined for symptoms of disease. Those seedlings grown in treated soil are protected from damping off and root rot.

Similarly, the formulations of Examples 26 and 27 can be employed for the control of the Pythium species.

*Example 39*

The emulsifiable formulation of Example 28 is applied to soil known to be infested with *Aphanomyces cochlioides*. The material is mixed with the soil at a rate of 80 pounds per acre prior to planting sugar beets. When the sugar beet seedlings are examined for disease, it is found that the chemical treatment provides good control of the disease.

Similarly, the formulations of Examples 29 and 30 can be employed for the protection of sugar beets against pathogenic fungi of the soil.

*Example 40*

The wettable powder formulation of Example 31 is mixed thoroughly into soil at a rate of 70 pounds per acre. The soil is known to be infested with *Rhizoctonia solani*. Potato seed pieces are planted and after the potato shoots have emerged, they are examined for distinctive lesions incited by Rhizoctonia. The potatoes grown in soil treated with the above materials were adequately protected from disease.

Similarly, the formulations of Examples 32 and 33 can be employed for the protection of potatoes against pathogenic fungi of the soil, such as the Rhizoctonia fungus.

*Example 41*

Each of the materials listed in Example 34 are injected into separate soil plots known to be infested with *Verticillium albo-atrum*. The treatment is made at a rate of 30 pounds per acre. Strawberries transplanted into the treated soil are found to be protected from the root rot and vascular wilt normally incited by this fungus.

Similarly, the compounds listed below can be prepared conveniently by procedures described above, and when formulated and applied to the soil as described above, give control of pathogenic fungi of the soil:

4-chloro-butene-1-sulfonyl fluoride
1,4-dichlorobutanesulfonyl fluoride
2,3,4,5,6-pentachlorohexanesulfonyl fluoride
2,6-dichloro-2-(chloromethyl)hexanesulfonyl fluoride
Trichlorononanesulfonyl fluoride
Dichlorododecanesulfonyl fluoride
Trichlorododecanesulfonyl fluoride

*Example 42*

A mixture of 10 parts by weight of dodecanesulfonyl fluoride and 25 parts of carbon tetrachloride is warmed to 45 to 55° C. and irradiated while a slow stream of chlorine is passed into the mixture for seven hours. $CCl_4$ is distilled off leaving a residue of 25 parts of viscous oil. Chlorine analysis indicates that the product has the empirical formula:

$$C_{12}H_{14}Cl_{11}SO_2F$$

and is a mixture comprising mainly undecachlorododecanesulfonyl fluorides.

The following formulation is prepared according to Example 22:

| | Percent |
|---|---|
| Undecachlorododecanesulfonyl fluorides | 30 |
| 30–60 mesh granular vermiculite | 70 |

This composition is mixed with soil infested with *Rhizoctonia solani* at a rate of 100 pounds per acre. Shortly thereafter a tomato crop is planted. The seedling tomato plants when examined after emergence are satisfactorily protected from the pathogen.

The claims are:

1. A fungicidal method which comprises applying to a locus to be protected a fungicidally effective amount of at least one compound selected from the formula:

$$R-SO_2F$$

where R is a chlorinated aliphatic hydrocarbon radical containing less than 13 carbon atoms per radical.

2. A fungicidal method which comprises applying to fungus infested soil at least one compound selected from the formula:

R—SO₂F where R is a chlorinated aliphatic hydrocarbon radical containing less than 13 carbon atoms per radical.

3. In a fungicidal method, the step of applying to a locus to be protected a fungicidally effective amount of at least one compound selected from the formula:

R—SO₂F where: R is selected from the group consisting of chlorinated alkyl and chlorinated alkenyl radicals containing less than 13 carbon atoms per radical.

4. In a fungicidal method, the step of applying to a locus to be protected a fungicidally effective amount of 3,3,3-trichloroethane sulfonyl fluoride as a soil fungicide.

References Cited in the file of this patent
UNITED STATES PATENTS

| | | |
|---|---|---|
| 2,114,577 | Schrader | Apr. 19, 1938 |
| 2,846,472 | Tiers | Aug. 5, 1958 |
| 2,878,156 | Davis | Mar. 17, 1959 |